United States Patent [19]
Roberts et al.

[11] Patent Number: 5,119,800
[45] Date of Patent: Jun. 9, 1992

[54] HOT WATER PAN FOR A CHAFER

[75] Inventors: Melvin F. Roberts, Niles; Christopher Stern, LaGrange, both of Ill.

[73] Assignee: The Vollrath Company, Inc., Sheboygan, Wis.

[21] Appl. No.: 296,482

[22] Filed: Jan. 12, 1989

[51] Int. Cl.⁵ .............................................. A47J 27/06
[52] U.S. Cl. ................... 126/377; 126/383; 126/386; 126/33; 126/43; 220/428
[58] Field of Search ............... 126/348, 369, 377, 383, 126/384, 386, 33, 43; 220/428; D7/366, 367

[56] References Cited

U.S. PATENT DOCUMENTS

| | | | |
|---|---|---|---|
| 175,339 | 3/1876 | Curtis | 220/428 |
| 285,351 | 9/1883 | Fickett | 22/428 |
| 725,335 | 4/1903 | Glaessner | 126/43 |
| 930,389 | 8/1909 | Kleinfelder | 126/377 |
| 2,622,591 | 12/1952 | Bramberry | 126/369 |
| 4,134,380 | 1/1979 | Niwa et al. | 184/1.5 |

OTHER PUBLICATIONS

Advertising Brochure by Bloomfield Industries, Inc., dated 1987 for Beverage Equipment, Food Warming and Holding and Transport Products.

Primary Examiner—Carroll B. Dority
Attorney, Agent, or Firm—Foley & Lardner

[57] ABSTRACT

A hot water pan for warming food in the food pan of a chafing dish. The hot water pan includes a central well for holding a volume of heated water and maintaining a warm food pan temperature. The hot water pan further includes a lip formation creating a water barrier with the edge of the food pan so that condensing water droplets do not flow from the hot water pan but are directed to return to the well.

16 Claims, 3 Drawing Sheets

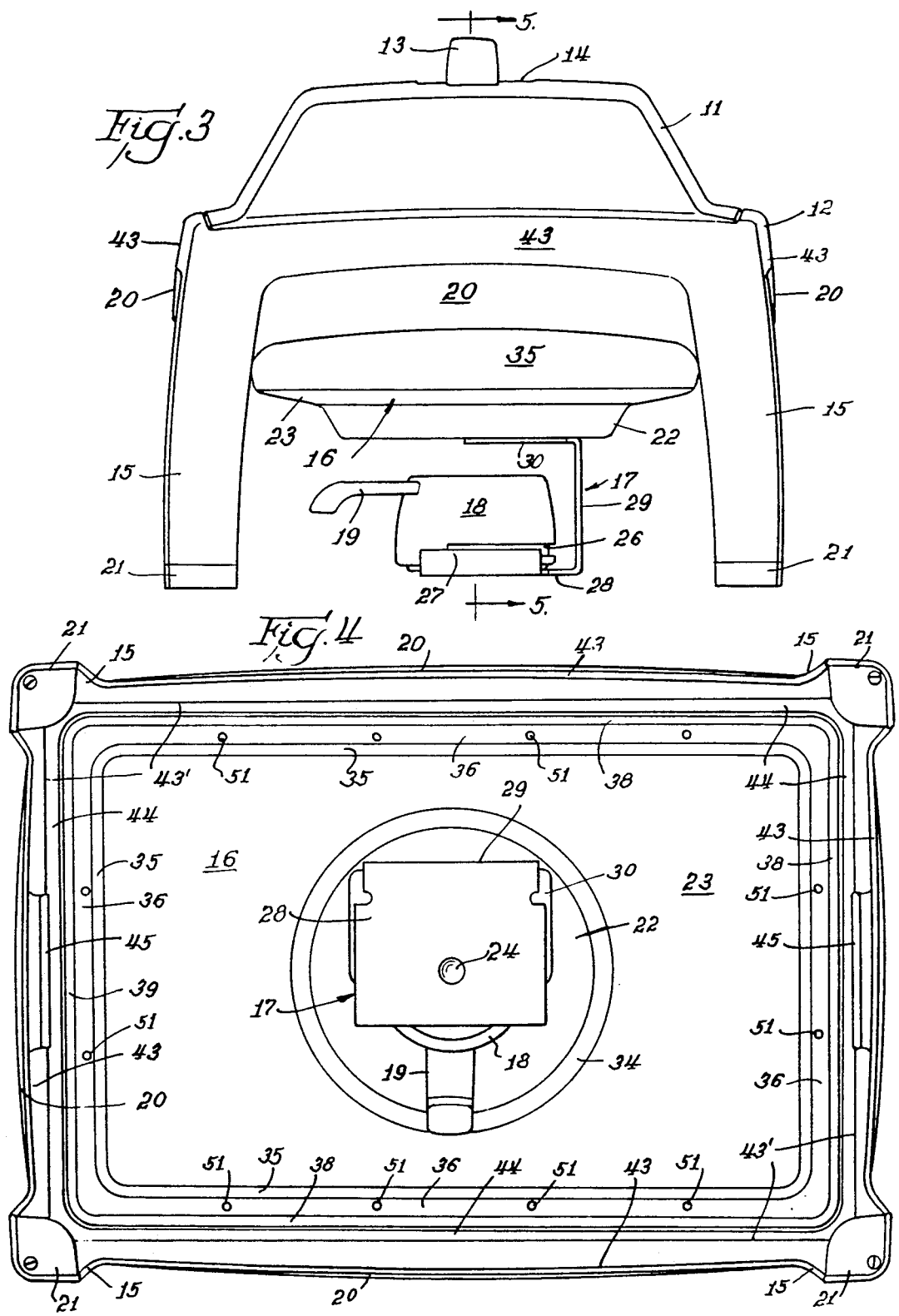

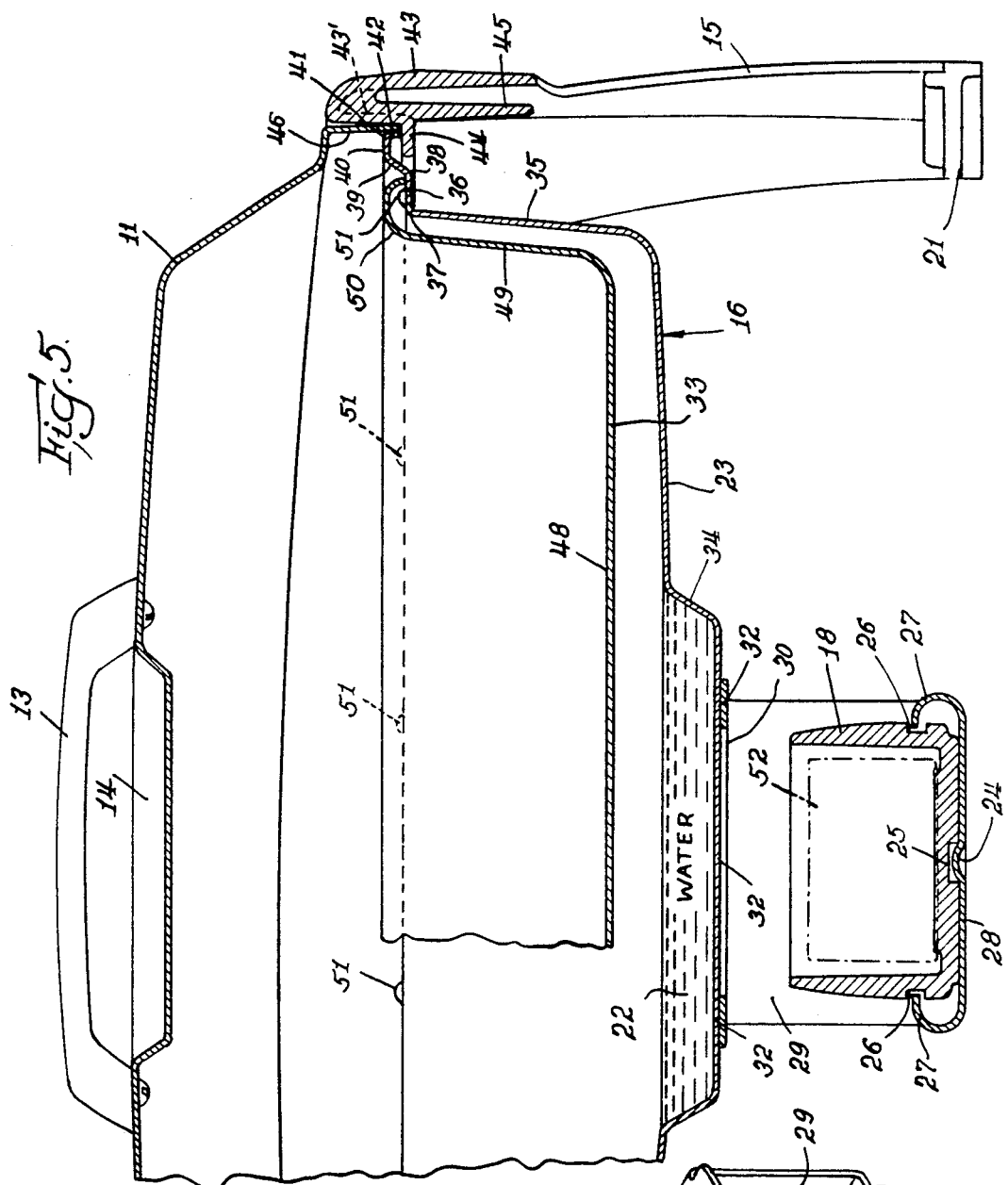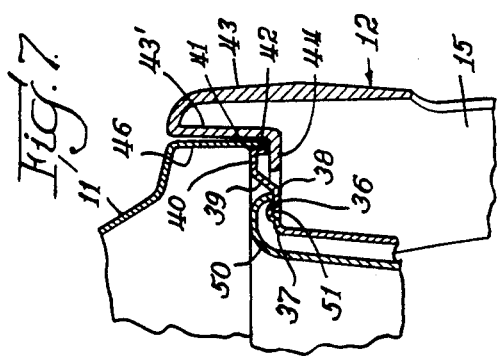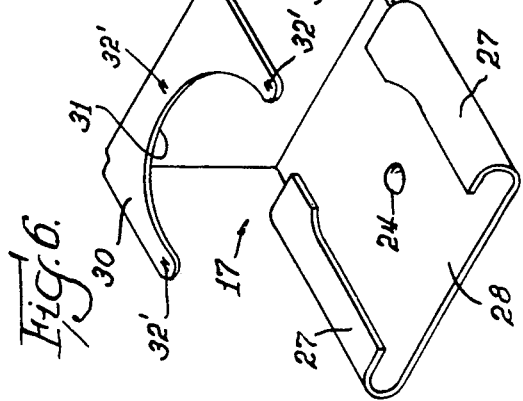

HOT WATER PAN FOR A CHAFER

BACKGROUND AND SUMMARY OF THE INVENTION

The present invention generally relates to chafers, or chafing dishes, wherein a heated water pan is supported below a food pan with a cover thereover. More specifically, this invention relates to an improved construction for the hot water pan of a chafer for efficiently maintaining the food pan at a desirable temperature using only a relatively small volume of water and a single source of heat therebelow.

Chafers are widely used by restaurants catering services, cafeterias, and the like, where food is to be kept warm for continuous serving to a large number of people, for example at banquets, hotel brunches, catered parties, etc.

Conventional chafers have a heated water pan that is supported by a base. A food pan, or tray, is supported within the hot water pan above the water level and typically has a peripheral lip that rests atop an outward flange or lip of the water pan. The lip of the water pan is supported by an inward support shoulder, or rib, of the base. Usually, multiple sources of heat, such as STERNO brand fuel, or wick-type devices, are ignited and reside below the hot water pan to heat the water. Conventional hot water pans have generally flat bottoms and the volume of water extends across the bottom at substantially the same depth throughout. For standard chafer sizes, about three gallons of water is the average amount to be heated and maintained for keeping the food pan warm, preferably at a temperature of from 140° F. to about 190° F.

Maintaining the water sufficiently hot to keep the food in the desired temperature range consumes significant amounts of fuel when numerous chafers are in use, such as at a hotel brunch, or the like, where many dishes are served. The use of multiple heating sources to heat these large volumes of water can be costly.

It is important that chafers are portable so that food service can be efficiently and quickly conducted remote from a kitchen preparation area. This may require that several chafers be transported from a kitchen in one part of a hotel, or restaurant, to a meeting or banquet room at another floor, building, etc.

The production of condensation from water vapor rising between the hot water pan and food pan is best treated if the water droplets can flow back to the hot water pan. It is therefore necessary for a hot water pan to account for the effect of water vapor condensing at the bottom and sides of the food pan.

Various configurations for the outer shape of the cover and base exist and can incorporate non-functional esthetic design appeal. Usually the food pan has a standard shape and is interchangeable with various base and cover designs as they might exist for the good reason of maintaining interchangeability. It would therefore be a mutual need for an efficient and improved hot water pan to be likewise interchangeable for use in various chafer configurations. As a result, an efficient hot water pan would be suitable for interchangeable use in plain-type institutional chafers, where esthetic appeal may not be required, and also for use in more fancy polished chrome, and stylishly shaped, chafers, such as found in hotel dining rooms and banquet facilities.

In accord with the interchangeable feature, a peripheral support lip formation, or flange, of a new hot water pan would be usable as a replacement for existing conventional type hot water pans that have the generally flat bottoms and require the inefficient utilization of large volumes of water.

Our invention satisfies the foregoing needs and goals of the food service industry by providing an improved efficient hot water pan capable of being supported on a chafer base for disposition below a food pan wherein, for example, only one can of STERNO-brand fuel is required rather than two cans, or more, that may be needed to heat conventional devices using the same capacity food pans. This desirable heating feature can be obtained by using a substantially smaller volume of water, but yet maintaining food at a "keep warm" temperature of from about 140° F. to about 190° F. during the cumbustion time of the heat source. Our invention also solves the water condensation problem by means of a water barrier construction at the lip of the hot water pan.

The inventive hot water pan also overcomes the prior art difficulties by the provision of a hot water pan that requires less than 25% of the hot water volume needed in conventional chafer constructions of equal food capacities.

BRIEF SUMMARY OF THE INVENTION

The invention may be summarized as a hot water pan for a chafer having a centrally located recess, or a well, for the containment of a volume of water therein with the surrounding portions of a bottom wall of the pan extending at a shallow slope to integrally meet an upward sidewall that terminates in a peripheral support lip. A source of heat such as a can of combustible artificial fuel may be supportively attached below the central well at a bracket attached to the undersurface thereof. The peripheral lip includes an out-turned first flange portion joining an upwardly sloped second flange that meets a generally horizontal flat third flange portion. The flat third portion terminates in a downwardly turned fourth flange portion for supportive contact atop support shoulder means of a chafer base. A plurality of spaced-apart positioning nodes are formed on the first flange portion. A strip of the first flange portion is defined between the positioning nodes and the upwardly sloped second flange portion for supportively engaging a peripheral edge of a food pan. A downturned conventional flange for a chafer cover may reside side-by-side with the outside of the downwardly turned fourth flange portion and rest atop the support shoulder means of the chafer base.

The hot water pan is preferably made of stainless steel and has a rectangular configuration with a shallow depth and central recessed well in a bottom wall. The hot water pan is provided to support a food pan therein with the bottom of the food pan spaced above the bottom wall of the hot water pan.

BRIEF DESCRIPTION OF THE DRAWINGS

Reference is now made to the appended drawings wherein like reference numerals throughout refer to the same elements.

FIG. 3 is an end elevational view of the chafer as in FIG. 1;

FIG. 4 is a bottom view of the chafer as in FIG. 1 and showing the underside of the hot water pan in accord with the invention;

FIG. 5 is a partial cross-sectional view of the chafer and hot water pan taken along line 5—5 of FIG. 1 and having a portion of the food pan broken away to show the interior of the hot water pan;

FIG. 6 is a perspective view of a support bracket for a heat source to be arranged below the hot water pan; and, FIG. 7 is a detailed fragmentary sectional view like the right hand segment of FIG. 5 but taken at a positioning node on the hot water pan lip showing the supportive engagement of the cover, hot water pan and food pan on the base.

DETAILED DESCRIPTION OF THE INVENTION

Figure 1:
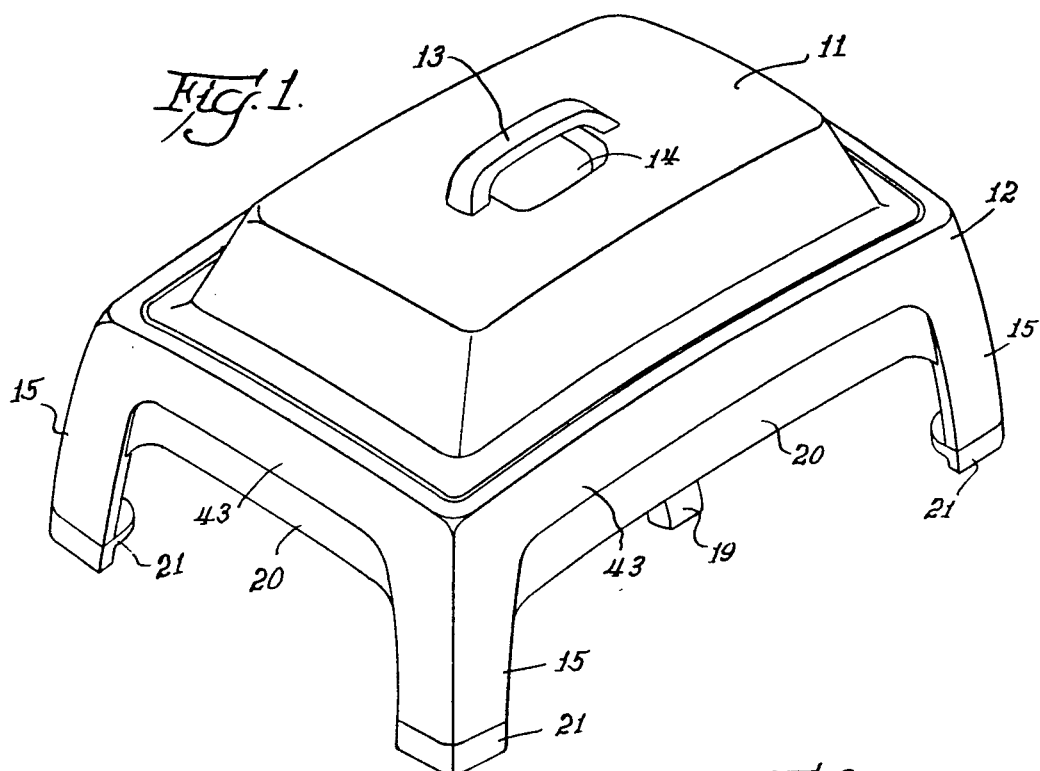
FIG. 1 is a perspective view of a chafer having a cover rested atop a base.
Figure 2:
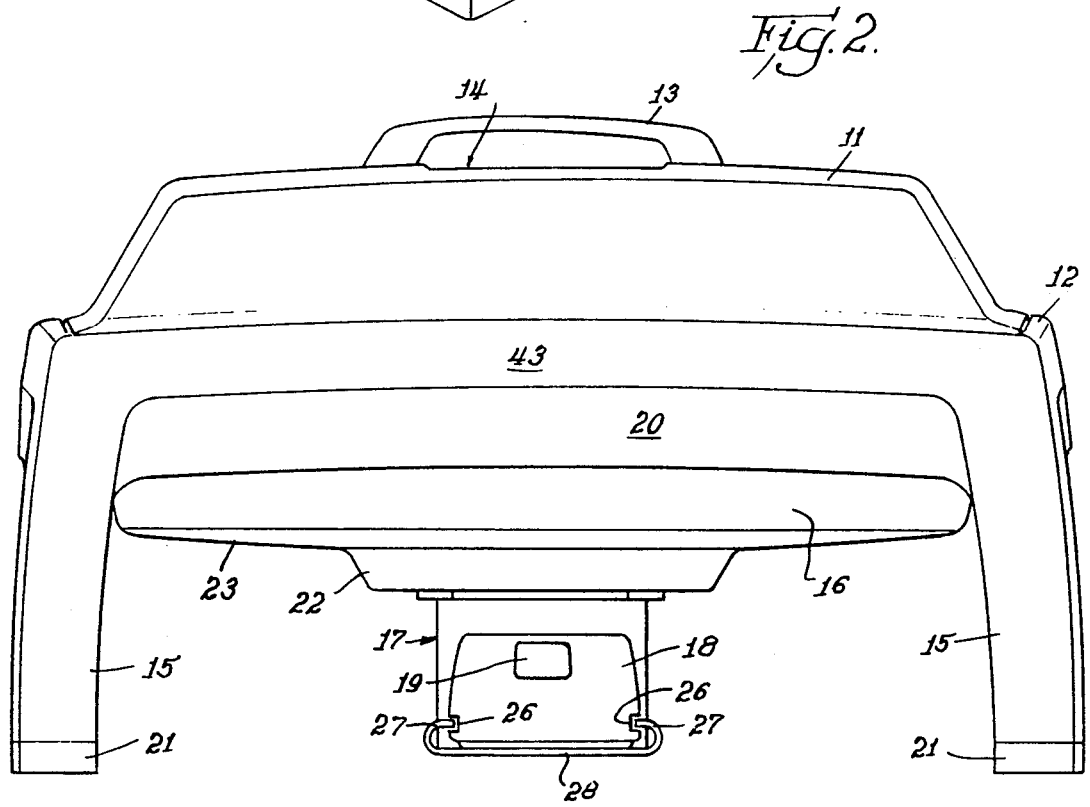
FIG. 2 is a front elevational view of the chafer as in FIG. 1.

FIG. 1 is a perspective view looking downwardly on a chafer 10 which has a cover 11 closed over a base 12. The cover 11 is provided with a handle 13 and has a central depression 14 whereby the food server's hand may grasp the handle 13 without contact against the potentially hot cover 11. The base 12 includes support legs 15 sufficiently long enough to space a hot water pan 16 above the serving table or counter so that, as shown in FIGS. 2 and 3, there is clearance for a bracket 17 to support a source of heat in a removable holder 18. The holder 18 includes a projecting handle 19 facilitating the removal and engagement of the holder 18 on the bracket 17 below the hot water pan 16.

Between adjoining pairs of legs 15, a depending skirt 20 extends and provides a visibility barrier to the casual observation of the hot water pan 16, bracket 17, and the holder 18. Each of the legs 15 has an insulating foot pad 21 which may have a decorative non-functional exterior configuration and color tone.

The inventive arrangement of our hot water pan 16 for the chafer 10 provides significantly improved efficiency in the heating and maintenance of food in the chafer 10. This is primarily provided by virtue of the unique well 22 formed centrally within the bottom wall 23 of the hot water pan 16.

As best viewed in FIG. 4, the bracket 17 is affixed beneath the well 22 whereby the central vertical axis of the cylindrical-like holder 18 is co-axial with the central axis of the well 22, which in preferred form is circular dish-shaped. A protruberance 24 from the bracket 17 is likewise coaxial with the central axis of the well 22 for registering with a central pocket 25 of the holder 18 in order to achieve alignment and also to help prevent the holder 18 from accidentally sliding off the bracket 17. The pocket 25 is best seen in the sectional view provided in FIG. 5. It will also be observed that the holder 18 further includes side slots 26 at opposite sides thereof which are slide engageable with rebent flange portions 27 of the bracket 17 for alignment and securement of the holder 18 to the bracket 17. The bracket 17, as viewed in FIG. 6, will be seen to have the protruberance 24 formed in a bracket bottom wall 28 from which the rebent flanges 27 extend. Rearwardly of the bottom wall 28 an upward wall 29 extends and forms a backstop upon the full insertion of the holder 18 into the bracket 17. A connection plate 30 is rebent from the upper edge of the wall 29 parallel to bottom wall 28 and back in a direction over the protruberance 24. The connection plate 30 has a concave slot 31 for accommodating the generally cylindrical shape of the holder 18. In the disclosed embodiment the bracket 17 is weld-engaged at connection plate 30 by means of spot welds 32 to the undersurface of the well 22. As shown in FIG. 6 the location of the connecting welds on connection plate 30 would be provided at points 32'. However, other forms of attachment may be used such as by providing downwardly threaded studs for bolted engagement, or other equivalent attachments that those skilled in the art would find compatible.

The cross-sectional view of FIG. 5 illustrates the containment of a volume of water within the well 22 in an efficient arrangment for heating a food pan 33 above. The well 22 includes an upwardly, and obliquely, sloping side wall 34 which meets the bottom wall 23. The bottom wall 23 is sloped toward the well 22 so that water will flow to the well 22. The bottom wall 23 curves upwardly to join an outer side wall 35 of the hot water pan 16. The side wall 35 extends upwardly at a slight oblique angle to terminate at a lip 36 which extends around the side wall 35 for support on the base 12 as will be explained.

The lip 36 is formed to position and hold the food pan 33 spaced from the side wall 35 and the bottom wall 23, and also to direct condensation created between the food pan 33 and hot water pan 16 to flow to the well 22. Additionally, the lip 36 provides for accommodation therearound of an edge flange of the cover 11 as will be explained hereinafter in conjunction with FIG. 5.

The lip 36 generally begins at a radiused bend 37 curving from the side wall 35 to a generally horizontal outward first flange 38. The first flange 38 extends to terminate at an outwardly and upwardly inclined second flange 39 which extends to an outwardly bent third flange 40 that is generally horizontal and parallel to the first flange 38. The third flange 40 is bent at a radius 41 to extend downwardly in a fourth, or end, flange 42 which is the portion of the lip 36 that supportively rests on the base 12. As best seen in the sectional view of FIG. 5, the base 12 includes an outer side wall 43 formed with an inner side wall 43' having an inwardly directed support shoulder 44 for the support of the end flange 42 of the hot water pan 16. For purposes of lifting and carrying the chafer 10, two flat extensions 45 extend from the inner side wall 43' at two opposing locations best illustrated in FIG. 4.

In the exemplary embodiment disclosed, the outer dimension of the lip 36 provides a space between the side wall 43' and the end flange 42 so that an edge flange 46 of the cover 11 may supportively nest therebetween as best shown in FIG. 5. Thereby, a tight heat seal is provided around the lip 36 of the hot water pan 16. In one optional form of the invention, the edge flange 46 may be inwardly bent to rest both against the side wall 43' and atop the third, or horizontal, flange 40 of the lip 36. Also, the lip 36 might be constructed to snugly butt the end flange 42 against the side wall 43' wherein the edge flange 46 of the cover 11 would be constructed to rest directly upon the horizontal third flange portion 40 of the lip 36. Another optional construction may provide a hollow double-wall, possibly including a foam insulation, for the cover 11, wherein the support of the cover 11 would envision the resting of a double-walled edge of the cover 11 upon the third flange portion 40. Many equivalents will be seen to fall within the scope of the invention.

The food pan 33 has a well-known standard construction allowing for interchangeable use in existing chafers having complementarily shaped support shoulder means. The food pan 33 comprises a generally flat bottom wall 48 that curves upwardly to a side wall 49 having an outwardly and concave downwardly curved hooked edge 50 for supportive engagement atop the first flange 38 of the lip 36, as best viewed in FIG. 5.

As depicted in FIGS. 5 and 7, spaced at regular intervals around the first flange 38 are positioning nodes 51 which are raised bump-like configurations formed by known metal stamping techniques, preferably envisioned for making the hot water pan 16. In the exemplary embodiment, the nodes 51 are centrally located on the first flange 38 at a spacing of about four inches center-to-center. The spacing may vary and need not be at regular intervals. The hooked edge 50 is supportably positioned between the nodes 51 and the slanted second flange 39 in order to be properly centered and laterally restrained in correct position on the hot water pan 16.

Both the food pan 33 and the hot water pan 16 are preferably formed of stainless steel which is well suited to meet sanitary and health code requirements. These members are easily formed by metal stamping procedures to create the conformations shown for use in the chafer 10.

The configuration for the lip 36 is provided to create a water barrier whereby water condensing on the food pan 33 will return down the side wall 35 of the hot water pan 16 from the first horizontal flange portion 38 of the lip 36. The condensing water is prevented from flowing upwardly therefrom because of the inclination of the slanted second flange 39. Condensing water will therefore travel downwardly to, and across, the sloped hot water pan bottom wall 23 as droplets fall from the walls 48, 49 of the food pan 33, as well as flowing downwardly from the side wall 35. The centrally sloped bottom wall 23 acts as a sump and directs condensing water back to the well 22. In the preferred embodiment the well 22 is illustrated for use with a conventionally sized chafer and holds about 22 to 32 ounces of water. A comparable conventional hot water pan would require up to three gallons of water. For purposes of illustration and explanation, a conventional hot water pan has a bottom wall that extends from the side wall in a generally flat horizontal plane, similar to the conformation of food pan 33. The improved effectiveness of the invention over the prior art devices is demonstrated by: easier handling due to lighter weight; the ability to reduce the amount of fuel consumption by requiring significantly less amount of water to be heated; and, the washing of water vapor underneath and against the food pan 33 as the water is heated and vapor moves upwardly and radially outwardly of the well 34 in the space between the bottom wall 23 and bottom wall 33.

The holder 18 is generally a hollow cylindrical cup-like member capable of holding a canister 52 of STERNO-brand artificial fuel, or equivalent. The typical fuel canister holds about 8 ounces of artificial fuel, which is conventionally made of solidified or solid, alcohol, but which may in fact be alcohol enclosed in the pores or cavities of a solid substance which serves as supporting sponge or framework, as is known in the art. Other canister-type combustible heat sources are similarly usable in the invention such as an artificial fuel sold under the brand name "HANDY FUEL". By means of the centering protruberance 24, the holder 18, and thereby the canister 52, are centrally positioned beneath the well 22. The water to be poured into the well 34 is desirably preheated, but may be poured into the hot water pan 16 at tap-water temperature. The amount of water within the well 22 may be about 20% to about 25% of the volume required in a conventional hot water pan to heat an equal-sized food pan, and the canister 52 will quickly bring the water to a sufficiently hot temperature in only several minutes. The hot water vapors are caused to move upwardly against the food pan 33 to transfer heat thereto for keeping food within the pan 33 desirably in the range of from about 140° F. to about 190° F. during the combustible life of the solid fuel in the canister 52.

By means of the flat extensions or handles 45, the chafer 10 may be, even in the filled condition, carried by a food server with greater ease than prior art devices holding up to three gallons of hot water, in addition to the weights of the food in the food pan, the chafer base and cover.

Accordingly, a highly efficient interchangeable hot water pan has been provided by the invention for the accommodation of a conventional food pan and for the support within complementarily formed chafer bases having inward shoulder flange means like, or equivalents of, the support shoulder 44. The invention therefore satisfies the needs of manufacturers of food serving and preparing equipment whereby a hot water pan and food pan may be interchangeably constructed in a wide range of different qualities from very fancy to plain institutional-oriented configurations that require less esthetic appeal. Additionally, the coordination of a hot water pan and food pan can be dimensionally sized to appropriately be used in complementarily sized chafers, e.g. large, intermediate and small volumes, thereby requiring only one food pan and hot water pan to be manufactured for use in a wide variety of styles and models at each volume capacity. A wide range of equivalents are considered to fall within the breadth of the claims appended hereto.

What is claimed is:

1. A chafer comprising, in combination:
   a cover and a supporting base, the supporting base including shoulder support means extending therefrom and inwardly of the cover;
   a food pan having a supportively engageable peripheral upper edge; and,
   a hot water pan containing a predetermined volume of water and including a well means for the retention of the entire predetermined volume of water therein and means for supporting the food pan therein, said means for supporting the food pan formed with means for supportively engaging the shoulder support means of said base and including means for forming a water barrier to direct any water condensing on the food pan to the well means.

2. The combination as claimed in claim 1 including means for supporting a heat source below the hot water pan.

3. The combination as claimed in claim 2 wherein the food pan support means of the hot water pan includes a first flange portion for supporting the upper edge of the food pan and terminating in an inclined second flange to form said water barrier, whereby condensing water is prevented from flowing outwardly of the hot water pan.

4. The combination as claimed in claim 1 wherein a bracket means is attached underneath said hot water pan and includes holding means for the holding therein of combustible fuel means for providing a source of heat beneath the well means.

5. The combination as claimed in claim 1 wherein the hot water pan is formed with a centrally sloping bottom wall and an upwardly extending side wall therearound, the well means being generally centrally located and formed with said bottom wall means to provide a central recess for the retention therein of hot water to be heated for maintaining any food in the food pan thereabove at a warm temperature.

6. The combination as claimed in claim 1 wherein the upper edge of the food pan comprises a downwardly hooked edge for supportive engagement at the food pan support means of the hot water pan.

7. The combination as claimed in claim 1 wherein the shoulder support means of the base comprises an inwardly directed flange and wherein the food pan support means of the hot water pan includes a downwardly directed end flange for supportively resting upon said inwardly directed flange.

8. A hot water pan for containing a predetermined volume of water for use in chafing dishes of the type having a base and support means extending inwardly of the base, said hot water pan comprising a continuous side wall extending around an integrally formed bottom wall sloping to at least one well means, the well means having a depth whereby to accommodate the entire predetermined volume of water in said hot water pan; said side wall terminating in an upper lip means for the supportive engagement thereupon of a food pan and for resting engagement on support means of a chafing dish base.

9. The hot water pan as claimed in claim 8 wherein the lip means includes a first flange portion generally lower than a second flange portion whereby water droplets on said first portion are prevented from flowing outwardly of the hot water pan.

10. The hot water pan as claimed in claim 9 wherein the first flange portion of the lip means includes a plurality of spaced apart positioning node means for the adjacent and outwardly positioning thereof of edge means of a food pan.

11. The hot water pan as claimed in claim 8 wherein the lip means includes a sloped second flange portion extending generally at an oblique angle from a first flange portion, the second flange portion terminating in outwardly extending flange means for said resting engagment on support means of a base.

12. A hot water pan for containing a predetermined volume of water for use in chafing dishes of the type having a base and support means extending inwardly of the base, said hot water pan comprising a continuous side wall extending around an integrally formed bottom wall sloping to at least one well means, the well means having a depth whereby to accommodate the entire predetermined volume of water in said hot water pan; and a holder means attached beneath the well means for supporting a heat source.

13. The combination of a food pan for a chafer and a hot water pan for the heating of food in the food pan, the food pan and hot water pan forming water barrier means therebetween whereby any water vapor condensing on the food pan is directed back to the hot water pan and prevented by said water barrier means from flowing outwardly therefrom, said water barrier means comprising edge means of the food pan supportively resting atop a first flange portion of said hot water pan, the first flange portion of said hot water pan being part of an upper lip configuration of the hot water pan, the upper lip configuration extending from a side wall of the hot water pan, said first flange portion of the upper lip configuration extending at a lower elevation than a second flange portion thereof, whereby any condensing water droplets formed at said edge means of the food pan or first flange portion of the hot water pan upper lip configuration are prevented from flowing outwardly of the upper lip configuration.

14. The food pan and hot water pan as claimed in claim 13 wherein the hot water pan further includes a generally centrally, located well, the well being formed in a bottom wall of said hot water pan whereby to provide for the retention of a volume of water at or below the level of the bottom wall.

15. The food pan and hot water pan as claimed in claim 14 wherein the food pan includes a bottom wall that is spaced above the hot water pan bottom wall, and the food pan further includes a side wall that is spaced inwardly of the hot water pan side wall whereby the only contact therebetween is the food pan edge means at the first flange portion of the upper lip configuration.

16. The food pan and hot water pan as claimed in claim 14 wherein a canister holding means is affixed below said well for the receipt and retention therein of a canister of artificial fuel whereby upon the combustion thereof the well and water therein are warmed.

* * * * *